United States Patent [19]
Standley et al.

[11] 3,880,695
[45] Apr. 29, 1975

[54] APPARATUS FOR BONDING SEALING RING TO A CLOSURE

[75] Inventors: Wendell Evert Standley, Lake Forest, Ill.; Norman David Adams, Libertyville, Ill.; David Allen Phelps, Waukegan, Ill.

[73] Assignee: Abbott Laboratories, North Chicago, Ill.

[22] Filed: Oct. 30, 1972

[21] Appl. No.: 302,311

[52] U.S. Cl. .............. 156/423; 100/93 P; 156/228; 156/556; 156/282; 156/293; 156/498; 156/583; 425/349; 425/DIG. 47
[51] Int. Cl. ............................................ B30b 15/34
[58] Field of Search .......... 156/583, 498, 228, 423, 156/499, 556, DIG. 15, 282, 293; 425/349, DIG. 47; 100/93 P

[56] References Cited
UNITED STATES PATENTS

| | | |
|---|---|---|
| 3,004,298 | 10/1961 | Haynie ....................... 425/DIG. 47 |
| 3,152,944 | 10/1964 | Mojonnier et al. ................. 156/498 |
| 3,193,884 | 7/1965 | Haynie et al. ................ 425/DIG. 47 |
| 3,383,260 | 5/1968 | Mojonnier .......................... 156/583 |
| 3,425,887 | 2/1969 | Bowen ................................ 156/583 |
| 3,449,183 | 6/1969 | Zelnick ............................... 156/583 |
| 3,490,099 | 1/1970 | Smith et al. ................. 425/DIG. 47 |
| 3,613,223 | 10/1971 | Bush ............................ 425/DIG. 47 |

*Primary Examiner*—Charles E. Van Horn
*Assistant Examiner*—Jerome W. Massie
*Attorney, Agent, or Firm*—Aaron L. Hardt; Robert L. Niblack

[57] ABSTRACT

Apparatus for bonding a sealing ring to a cap without damaging other portions or preassembled parts of the cap. The apparatus comprises a post or mandrel shaped to conform with the configuration of the cap to be handled and adapted to support the cap and a press having an opposing cavity likewise conforming to the configuration of the cap, the press including appropriate heated and cooled areas to prevent potential damage to the cap or preassembled parts thereof during bonding of the sealing ring to the cap.

8 Claims, 5 Drawing Figures

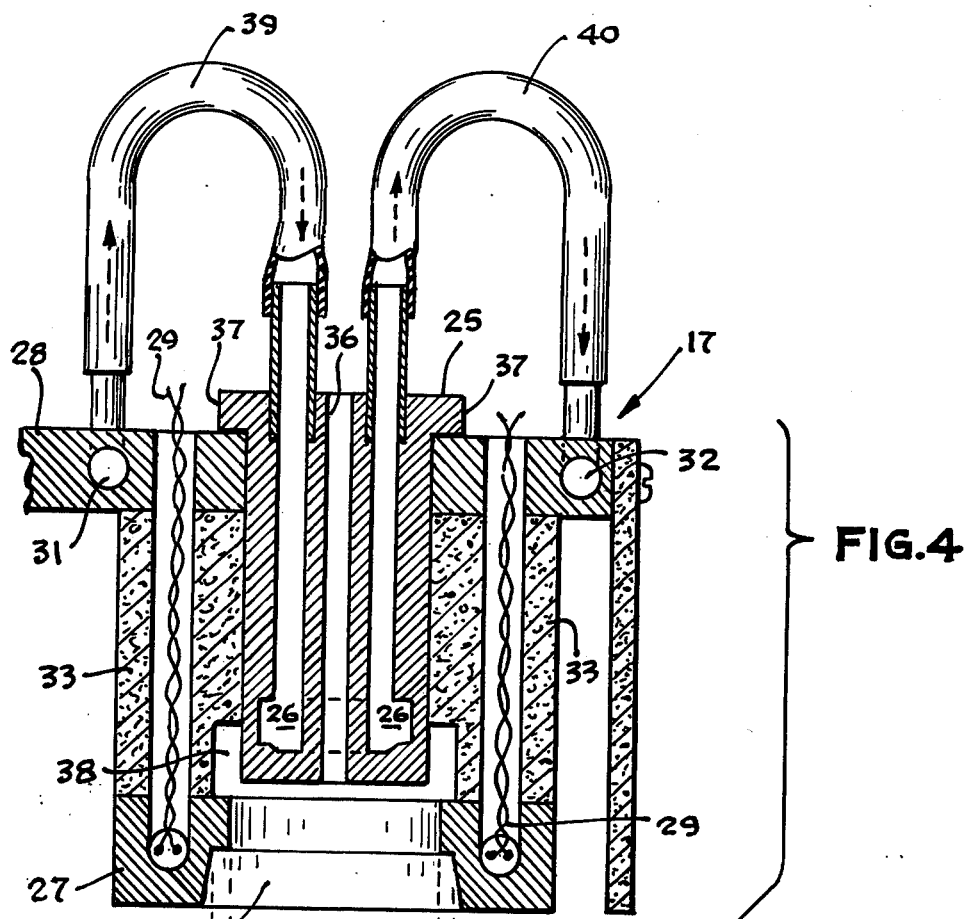
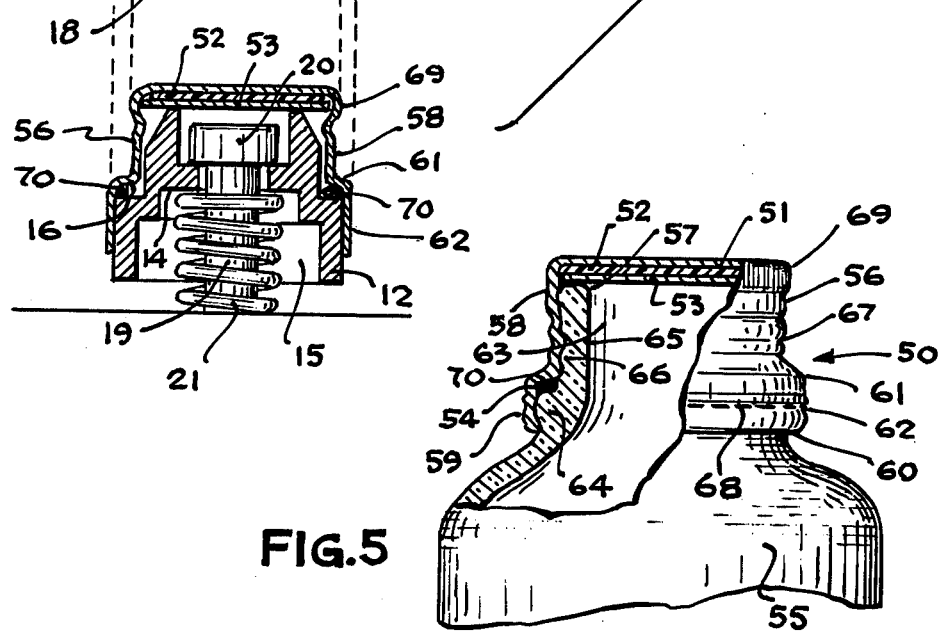
FIG.4
FIG.5

APPARATUS FOR BONDING SEALING RING TO A CLOSURE

BACKGROUND OF THE INVENTION

It is desirable with many products stored in a container that the container closure provide an effective seal to prevent contamination of the contents of the container. With a conventional bottle and screw-type cap closure combination, in which the closure comprises a cap having at least one disc in the inside for sealing against the mouth of the bottle; contamination may occur along the wall of the cap adjacent to the bottle neck. To prevent contamination from entering along the walls of the cap, a secondary seal can be positioned at the bottom of the cap. With such caps, it is desirable to preassemble the sealing disc within the cap prior to further assembly and forming operations. Since heat and pressure is necessary to bond the secondary seal to the cap, difficulty can arise in preventing damage to other portions of the cap and preassembled components thereof during the bonding operation.

SUMMARY OF THE INVENTION

The invention comprises a press including a holder with at least one post or mandrel projecting therefrom and conforming to the internal configuration of the caps to be handled, plus a workhead having a corresponding opposing cavities or dies conforming to the external configuration of the caps. The workhead includes appropriate heated and cooled areas so that heat is applied only to the cap area as necessary for bonding of the sealing ring to the cap, while at the same time other critical areas of the cap are kept cool in order to prevent damage to other portions of the cap or preassembled parts thereof, such as bonding of the plastic slip disc or inner discs to each other or to the cap. In operation, the sealing ring is positioned on the mandrel and the cap is placed over it. The mandrel is then raised to position the cap and mandrel within the corresponding cavity or die in the workhead and heat and pressure is applied to bond the sealing ring to the cap.

DESCRIPTION OF THE DRAWINGS

The present invention and various features and details thereof together with the method of employing the invention are hereinafter more fully set forth with reference to the accompanying drawings, wherein:

FIG. 4 is a side view, in cross section, of the press; and

FIG. 5 is a side view, partially in cross section, illustrating a closure having a primary and secondary seal and affixed to a bottle.

DETAILED DESCRIPTION

Figure 1:
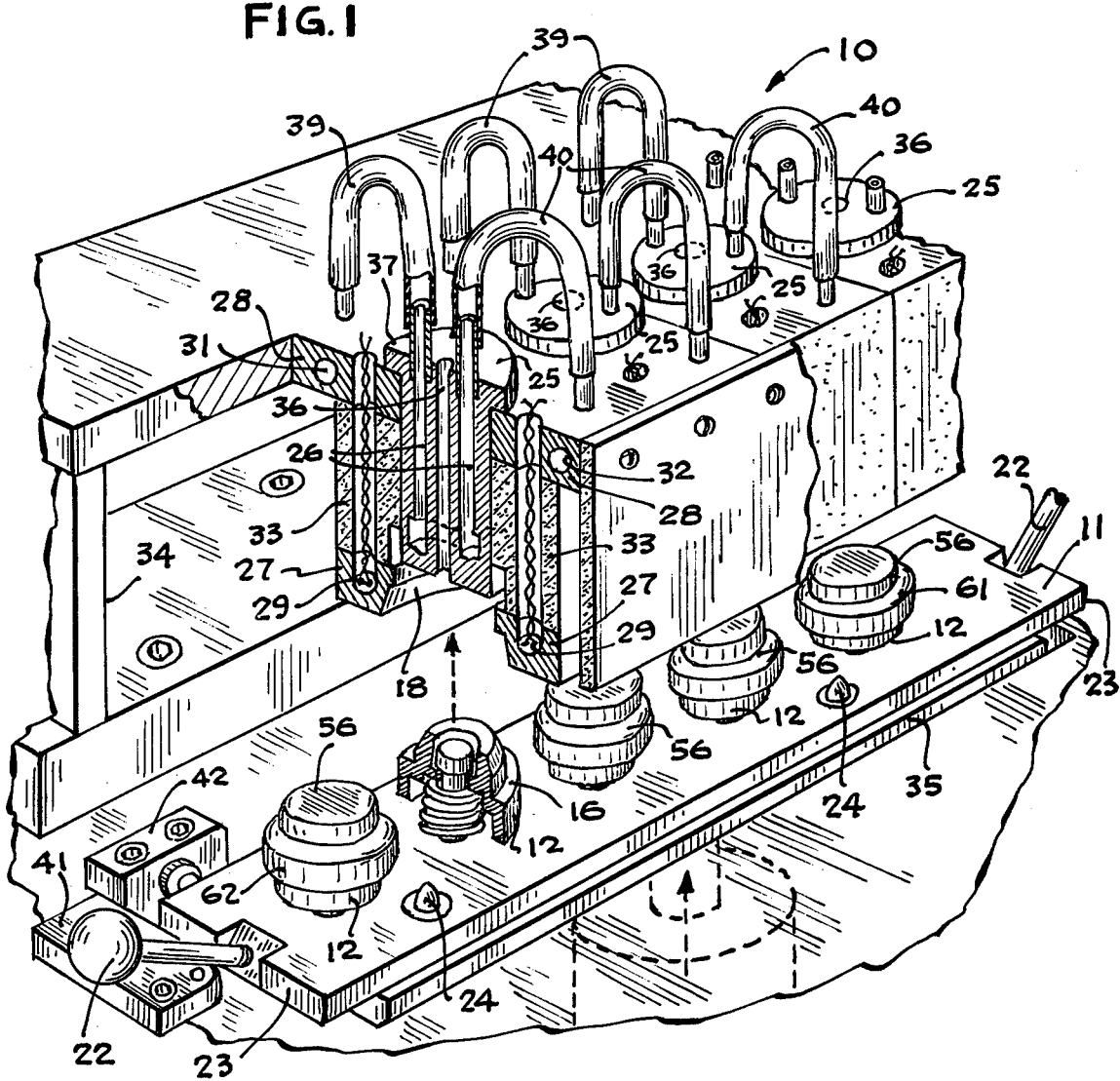
FIG. 1 is a perspective view, partially in cross section, illustrating the press of the present invention.

Referring to the drawings, FIG. 5 illustrates a closure 50 having a primary and secondary seal 54 affixed to a bottle 55. The closure 50 comprises a cap 56 with at least one disc on the inside thereof which seats on the edge or finish 57 of the bottle 55 to provide a primary seal 51. As illustrated, the primary seal 51 includes a plastic slip disc 52 together with an aluminum disc 53. If desired, plastic or rubber sealing discs can be used in place of or in addition to the aluminum disc 53. The cap 56 includes a depending wall portion 58 having a generally enlarged segment 59 on the open end 60 thereof comprising a horizontal flange 61 from which depends a skirt 62. As can be seen, the closure 50 conforms to the mouth 63 of the bottle 55, the flange 61 being seated on the bead 64 in the neck 65 of the bottle 55. After being positioned on the bottle 55 using conventional means, the skirt 62 of the closure 50 is crimped around the bead 64 to affix the closure 50 to the bottle 55. If the neck of the bottle 55 includes helical threads 66, corresponding threads 67 can be formed in the wall 58 of the closure 50. A score line 68 or perforation is formed around the circumference of the skirt 62 to permit removal of the cap 56 and to provide a tamper-proof feature. A secondary seal 54, illustrated as a rubber ring 70, is positioned in the flange 61 portion of the cap 56 and seats on the bead 64 of the bottle 55 to provide an effective seal. It is preferable that the sealing discs 52,53 and cap 56 be pre-assembled prior to application of the secondary seal 70 to the cap. Accordingly, in bonding the secondary seal 70 to the cap 56, it is necessary to prevent any damage from occuring to the sealing discs or primary seal 51.

FIGS. 1 through 4 illustrate apparatus 10 for bonding the sealing ring 70 to the cap 56 and basically comprises a press 10 including a holder 11 with a plurality of posts or mandrels 12 projecting therefrom, the posts 12 conforming to the internal configuration of the caps 56 to be handled, plus a workhead 17 having a corresponding number of cavities or dies 18 conforming to the external configuration of the caps 56 with appropriate heated and cooled zones so that heat can be applied only to the cap area as necessary for bonding of the ring 70 to the cap 56, while at the same time maintaining other critical areas of the cap 56 cool in order to prevent undesirable damage to the pre-assembled parts 52,53 of the cap 56, such as bonding together of the plastic slip disc 52 and other discs.

Figures 2, 3:
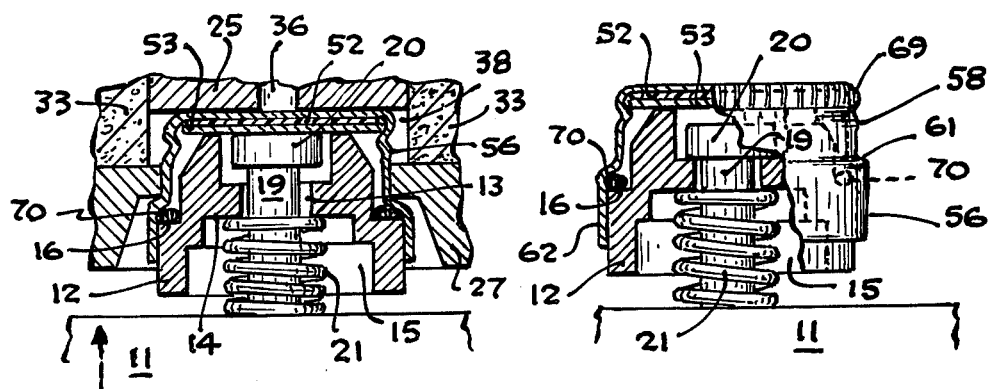
FIG. 2 is a side view, partially in cross section, illustrating a post with a cap and sealing ring thereon prior to insertion into the die for bonding of the sealing ring to the cap.
FIG. 3 is a side view in cross section of a die with the post and cap inserted therein for bonding of the sealing ring to the cap.

As illustrated, the holder 11 comprises a flat plate with a plurality of posts 12 extending therefrom, the external configuration of the posts 12 conforming to the internal configuration of the caps 56 to be handled, as best illustrated in FIG. 2. The posts 12 ride freely on a guide pin 19 which fits through an internal opening 13 in the posts, the guide pin 19 having a head 20 to restrain vertical movement of the post 12. A spring 21 is positioned over the guide pin 19 and engages the top of the plate 11 and the bottom surface 14 of the inside 15 of the posts 12 to bias the post 12 upwardly and insure that equal pressure is applied to all of the caps 56 when they are inserted in the dies 18. A pair of handles 22 extend from the ends 23 of the plate 11 to provide convenient gripping means for manipulating the holder 11 during application of the ring 70 to the cap 56 and for positioning within the press 10. Likewise, a pair of alignment pilot pins 24 are placed in the plate 11 to provide proper alignment of the holder 11 within the press 10.

FIG. 4 illustrates a press unit 10, the other units being constructed in like fashion. A freely floating spool 25 is positioned in the workhead 17 above and in engagement with the cavity or die 18, the spool 25 having a passage way or flow path 26 therein for entry and exit of cooling water and being movable in an axial direction.

The cavity 18 and floating spool 25 are supported within a pair of opposed blocks 27,28, the lower block 27 being heated by a heating element 29 embedded therein, the die 18 being formed within the heated block 27. The upper block 28 includes a pair of opposed passageways 31,32 therein which comprise a water manifold for the transmission of cooling water into and out of the floating spool 25. Insulating blocks 33 are positioned between the opposed supporting blocks 27,28 and abut the spool 25 and heating elements 29 to keep critical areas of the cap 56 cool in order to prevent undesirable action such as causing the pre-assembled parts of the cap 56 to bond together. Through the upper block 28, the workhead 17 is supported on a frame 34 in a fixed position. If desired, the holder 11 can be held stationary and the workhead 17 raised or lowered over the posts 12 to complete the cycle.

After the rings 70 and caps 56 are placed in position on the posts 12, the holder 11 which rests on a reciprocating platen pad 35 is raised by means of an air cylinder (not shown) to position the caps 56 and posts 12 within the dies 18. Heat and pressure is then applied to bond the sealing ring 70 to the cap 56 and the posts 12 are then retracted upon completion of the cycle.

Referring to FIG. 4, before the post 12 and cap 56 are inserted into the cavity or die 18, the floating spool 25 is in a lowered position with the shoulder 37 of the spool 25 resting on the top surface of the upper block 28. As the post 12 and cap 56 are inserted into the die 18, the top surface of the cap 56 engages the bottom surface of the floating spool 25 so that the spool 25 rises as further pressure is applied. The crown 69 of the cap 56 then enters a clearance space 38 above the heated block 27. Heat and pressure is then applied which is concentrated at the shoulder 16 of the post 12 and the flange 61 of the cap 56 so that the sealing ring 70 is bonded to the cap 56. While heat and pressure is being applied to the cap, the crown 69 of the cap is kept cool by the water cooled floating spool 25 which rests on top of the cap 56 and by the insulating blocks 33 which surround the clearance space 38 in which the crown 69 of the cap 56 is retained. Each floating spool 25 preferably includes an axial opening 36 running the length thereof which permits hot air to escape from the cavity 18 to further assist in keeping the crown 69 area of the cap 56 cooled. The axial opening 36 can also be used for the insertion of a push-out rod (not shown) for the removal of any caps 56 that might jam in the cavity 18.

As illustrated, each floating spool 25 is cooled by a cooling fluid which passes through the manifold 31, through the flexible tube 39 and into the flow path 26 in the spool 25. The cooling fluid then exits through a second flexible tube 40 and into the exit manifold 32.

The press 10 further includes a timing and actuating mechanism (not shown) to effect operation thereof. The timing and actuating mechanism may be comprised of a number of conventional elements and mechanisms arranged and coordinated to apply proper heat and pressure to the cap 56 and sealing ring 70 to bond the sealing ring 70 to the cap 56. While the invention has been described in connection with the bonding of a sealing ring to the cap 56, a plastisol may be employed as a secondary seal, the plastisol being applied to the cap 56 which is then placed in the press 10 to bond the plastisol to the cap 56.

Likewise the closure 50 is applied to a bottle 55 in a conventional manner. The cap 56, prior to assembly to a bottle 55 has a straight-sided, generally cylindrical wall 58 and skirt 62 and is usually applied to a filled bottle in automatic capping apparatus wherein the side wall 58 is rolled to produce threads 67 conforming to the threads 66 on the bottle 55. The cap 56 at this point is positioned on the container or bottle 55 so that the horizontal flange 61 and sealing ring 70 seats on the bead 64 in the bottle neck 65. In this position, the lower edge of the depending skirt 62 of the cap 56 is crimped under the bead 64 in the bottle 55. If desired, the cap wall 58 and skirt 62 may be rolled simultaneously to form the threads 67 in the cap 56 and crimp the skirt 62 on the bottle bead 64.

When it is desired to remove the closure 50 from the bottle 55, the user supports the bottle 55 in one hand and grips the closure 50 with the other, turning the closure 50 in the direction to remove it from the bottle 55. The twisting action creates a circumferential force causing separation of the skirt 62 at its weakest point which is along the score line 68. Continued twisting of the cap 56 divides the skirt 62 into sections permitting removal of the cap 56 from the bottle 55. The cap 56 may subsequently be replaced on the bottle 55 or a different closure or attachment having screw threads thereon can be attached.

Depending on production requirements, the press 10 can be utilized either in a manual or automatic operation. In a manual operation, individual operators can be positioned around a table, with the holder 11 being transferred from one station to another manually and the sealing ring 70 and the cap 56 being placed on the posts 12 manually. In a manual operation, a holder 11 having a plurality of posts 12 thereon can be manually transferred from a first station where the sealing rings 70 are placed on the shoulder 16 of the posts 12. The holder 11 is then transferred to a second station where the caps 56 are placed over the post 12 and sealing rings 70. The holder 11 is then transferred to the press 10 where an operator positions it on the platen pad 35 between the guides 41, manipulating the holder 11 by means of the handles 22. The alignment pilot pins 24 together with a pair of sensors 42 insure that the holder 11 is properly and safely positioned with the press 10. The operation can be automated by providing for handling of the holders 11 by means of conveyors and for automatic feeding of the rings 70 and caps 56 from hoppers.

By proper design of the mandrel 12 and corresponding die 18, the apparatus 10 of the present invention can be utilized to bond a seal to closures of various configurations.

What is claimed is:

1. Apparatus for bonding a sealing ring to a closure cap having a crown and depending wall, said apparatus comprising:

a mandrel conforming to the internal configuration of said crown and depending wall of said closure cap to be handled and including a shoulder on its periphery for receiving and supporting said sealing ring adjacent to said depending wall of said closure cap prior to the bonding of said sealing ring to said closure cap; and a workhead including a die conforming to the external configuration of said closure cap, a floating spool positioned above said die in a manner such that said crown of said closure cap engages the bottom of said spool when said closure cap is inserted in said die, said spool movable in an axial direction and having a passageway therein for the entry and exit of cooling fluid, a heated block coextensive with and surrounding said die, insulating blocks between and abutting said spool and heated block, and a clearance space above said die for receiving said crown of said closure cap when said closure cap is inserted into said die;

whereby said mandrel supports said closure cap and sealing ring during bonding of said sealing ring to said depending wall of said closure cap and said workhead provides appropriate heated and cooled zones so that heat can be applied to said depending wall as required for bonding said sealing ring to said depending wall, while maintaining said crown of said closure cap cool.

2. The apparatus of claim 1 including a block positioned opposite the heated block for supporting the floating spool and insulating blocks therebetween, said block having a pair of opposed passageways therein which comprise a fluid manifold for the transmission of cooling fluid into and out of the floating spool, and tubing means connecting said opposed passageways and the passageway in the spool, respectively, to provide a flow path for fluid into and out of the spool.

3. The apparatus of claim 2 wherein the mandrel includes an internal opening therein and a guide pin fitting through said opening, the guide pin projecting from a holder for supporting and transporting the mandrel.

4. The apparatus of claim 3 wherein said mandrel includes biasing means to bias the mandrel upwardly.

5. The apparatus of claim 4 wherein the floating spool includes an axial opening running the length thereof to permit hot air to escape from the die.

6. The apparatus of claim 5 including means for positioning the mandrel within the corresponding dies.

7. The apparatus of claim 6 wherein said means for positioning the mandrel within the corresponding dies comprises a reciprocable platen pad for receiving the mandrel holder and means for raising and lowering the platen pad.

8. The apparatus defined in claim 1 wherein said apparatus includes a plurality of said mandrels and workheads.

* * * * *